May 7, 1929. H. P. McCANN Re. 17,289

APPARATUS FOR HEATING AND TRANSFER OF ARTICLES

Original Filed March 17, 1926 4 Sheets-Sheet 1

Inventor
Harry P. McCann,
By Stell, Buck & West.
Attys.

May 7, 1929. H. P. McCANN Re. 17,289

APPARATUS FOR HEATING AND TRANSFER OF ARTICLES

Original Filed March 17, 1926 4 Sheets-Sheet 2

Inventor
Harry P. McCann
By Hull, Brock & West,
Attys.

May 7, 1929. H. P. McCANN Re. 17,289
APPARATUS FOR HEATING AND TRANSFER OF ARTICLES
Original Filed March 17, 1926 4 Sheets-Sheet 3
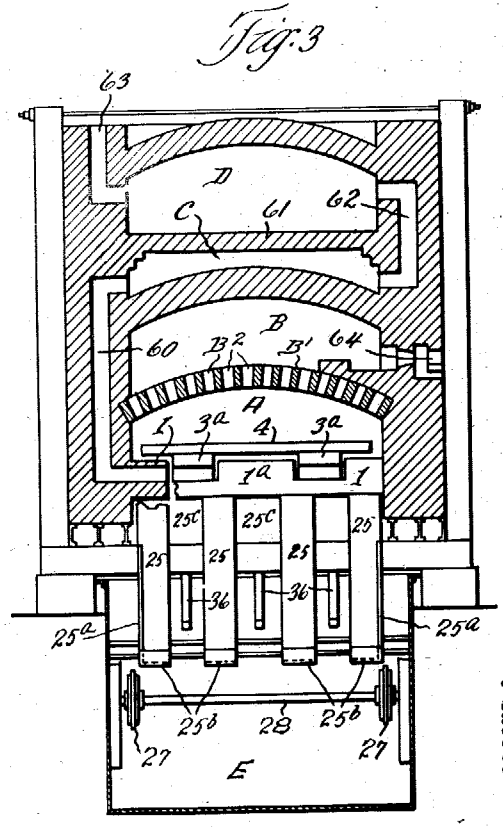
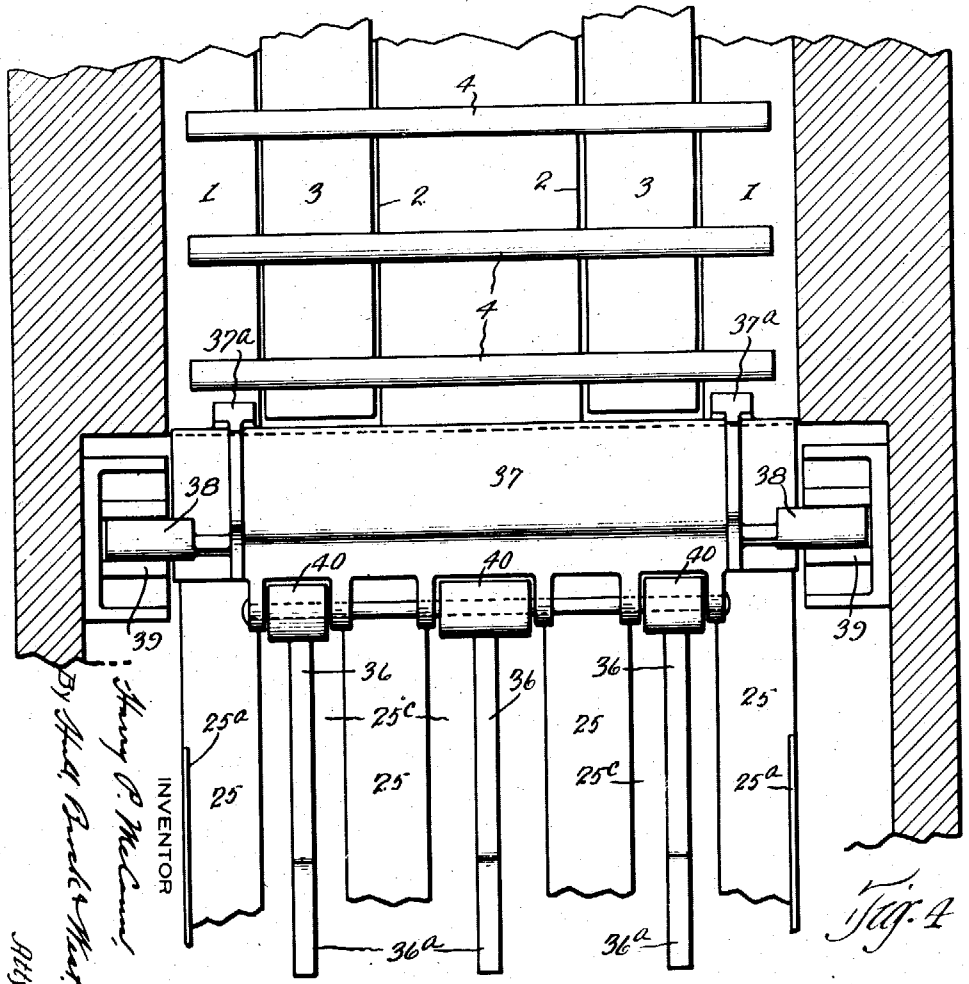
INVENTOR
Harry P. McCann,
By Hull, Brock & West.
Atty's.

May 7, 1929. H. P. McCANN Re. 17,289

APPARATUS FOR HEATING AND TRANSFER OF ARTICLES

Original Filed March 17, 1926 4 Sheets-Sheet 4

INVENTOR

Henry P. McCann,
By Hull, Brock & West.
Attys.

Reissued May 7, 1929. Re. 17,289

UNITED STATES PATENT OFFICE.

HARRY P. McCANN, OF CLEVELAND, OHIO.

APPARATUS FOR HEATING AND TRANSFER OF ARTICLES.

Original No. 1,668,164, dated May 1, 1928, Serial No. 95,258, filed March 17, 1926. Application for reissue filed May 21, 1929. Serial No. 348,928.

This invention relates to furnaces used for metallurgical purposes, and more particularly to furnaces of the type that are employed for the heat-treatment of articles and wherein the articles are conveyed through one or more heat-treating chambers at a rate of travel which will permit them to receive the desired or necessary treatment before being finally removed or discharged therefrom.

Figure 1:
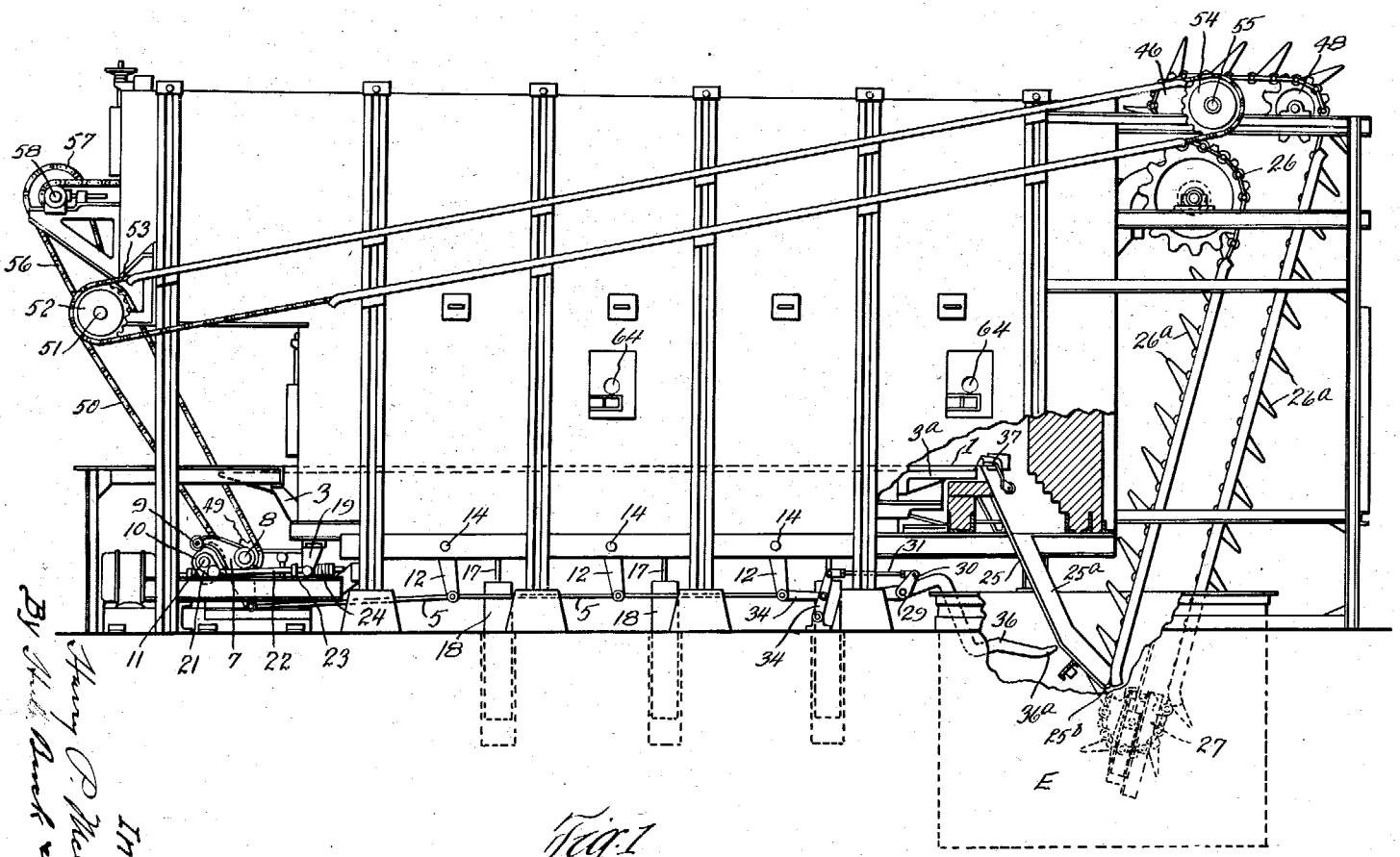
Figure 2:
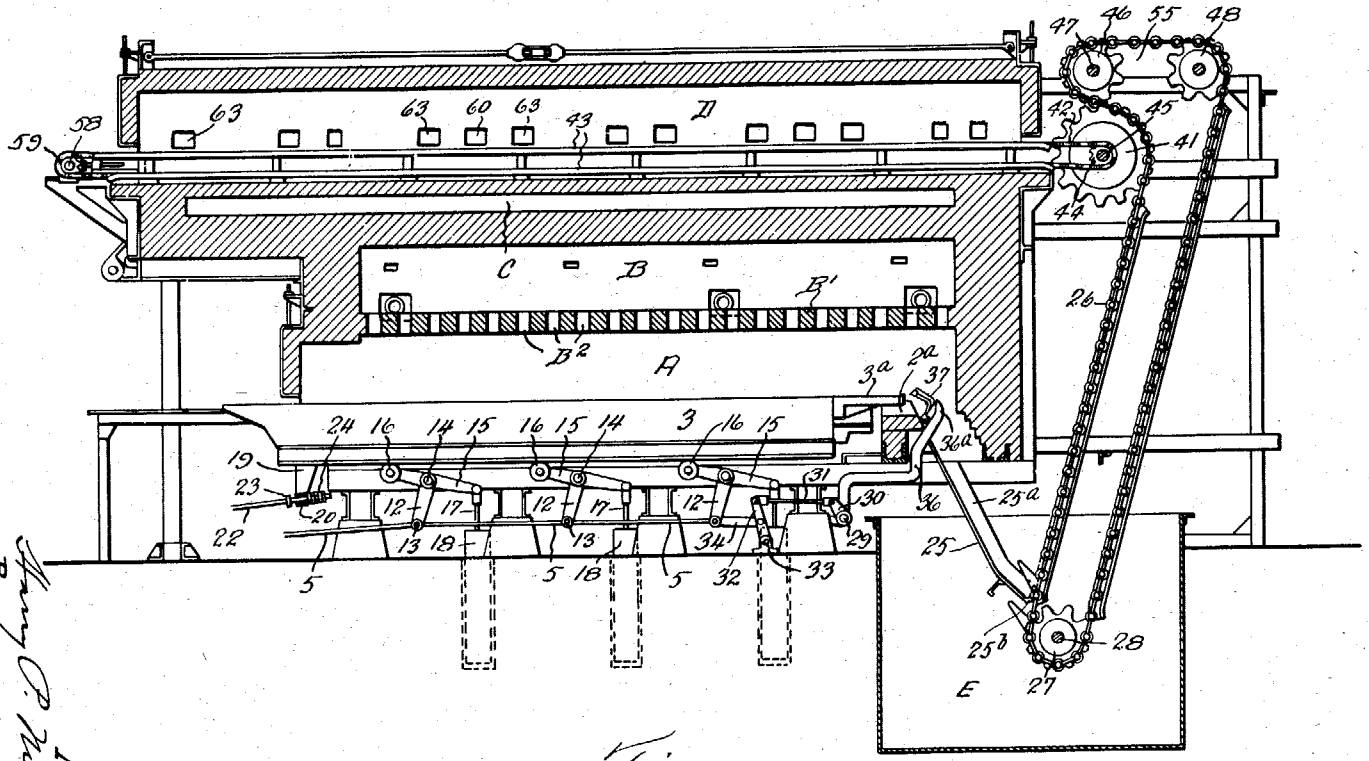
Figure 5:
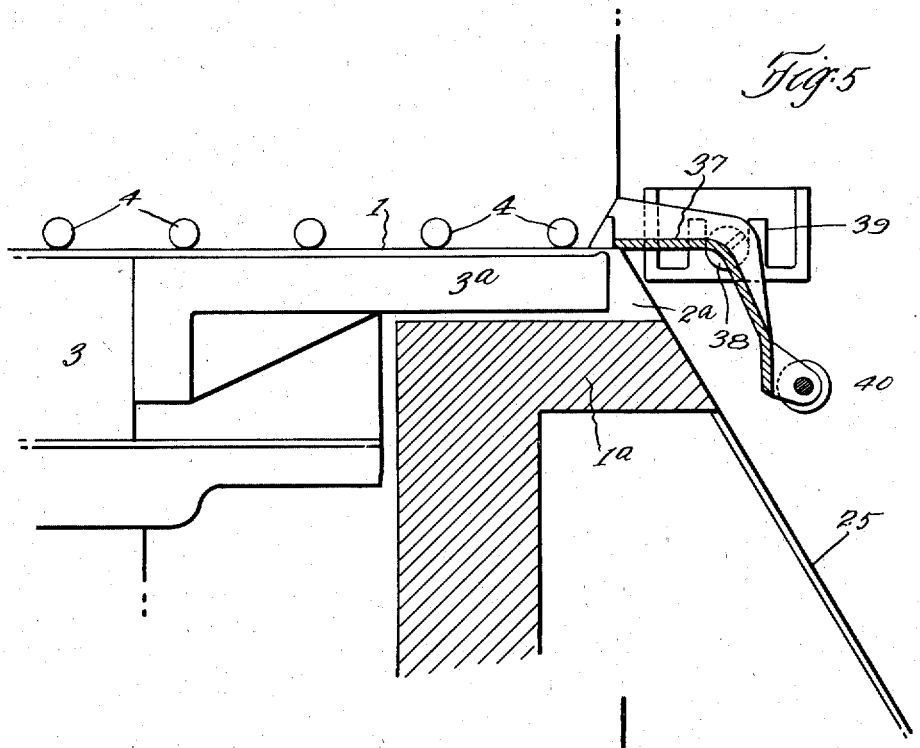

Among the general objects of the invention, are the provision of a furnace with a quenching tank and with means for delivering the articles, in a suitable manner and preferably one at a time, into such tank; also to provide a furnace of the character described with efficient means for transferring the articles automatically from the quenching tank to another heat-treatment chamber. Further and more limited objects of the invention will be set forth in the specification and will be accomplished in and through the construction and arrangement of parts shown in the drawings, wherein Fig. 1 represents a side elevation of a furnace embodying my invention, the rear of the furnace being broken away and the walking beams being in their lowered or non-feeding position; Fig. 2 a vertical longitudinal section through said furnace, the parts being in the positions which they assume when the beams are in elevated feeding position; Fig. 3 a transverse sectional view through the rear portion of the furnace shown in Fig. 2; Fig. 4 a detail in plan of the rear part of the furnace, showing the mechanism for receiving the articles from the lower heat-treatment chamber, and for delivering them to the quenching tank and to the elevating conveyor; Fig. 5 a detail in section of the mechanism shown in Fig. 4, the parts being in the positions which they assume prior to delivering an article to the quenching tank; and Fig. 6 a view similar to Fig. 5, showing the positions assumed by the parts when an article is being delivered to the quenching tank.

In the preferred embodiment of my invention, I have illustrated somewhat diagrammatically a heat-treatment furnace of the type shown in my application No. 10,770 filed February 21, 1925 now Patent 1,697,129 issued Jan. 1, 1929 and I have shown the said furnace as provided with a hearth having a walking-beam arrangement for feeding articles along the hearth and through the heat-treatment chamber above such hearth in substantially the same manner as shown in my Patent No. 1,400,367 issued December 13, 1921. The furnace so illustrated and so equipped is provided with a quenching tank, a chute for conducting into the tank articles delivered successively thereto by the intermittent movements of the walking beams; there being special means for supporting the articles in the chute against tilting and for insuring the delivery of the same in proper relation to conveying means by which the said articles are transferred from the quenching tank to another heat-treatment chamber—preferably in the same furnace and above the first-mentioned chamber.

Describing the parts by reference characters, A represents a lower heat-treatment chamber, B a combustion chamber thereabove, C a distributing chamber above the chamber B, and an upper heat-treatment chamber.

The chamber A is provided with a hearth 1 provided with longitudinal slots 2 therethrough (Fig. 4) in which there are disposed walking-beams 3 for moving the work-articles (shown as round bars 4) step by step through the said chamber. In order to move the articles through the chamber 1 in the manner described, I have provided mechanism similar to that shown in my patent aforesaid whereby the beams 3 will be elevated above the hearth sections 1, thereby lifting the articles from such sections; will be moved rearwardly the desired distance while in such elevated position, carrying the articles rearwardly with them, will then be lowered, thereby to deposit the articles upon the hearth sections in advanced position; and will finally be moved, below the hearth level, to initial position. The mechanism for effecting this result comprises levers adapted to raise and lower the said beams, with other mechanism operating upon the beams, when elevated, to move them rearwardly the desired distance and to operate upon the beams, when lowered, to move them a like distance in the reverse direction. The lifting mechanism will now be described:—5 denotes a rod extending longitudinally of the furnace below the central portion thereof, the said rod being pivotally connected at its front end with the lower end of a lever 7 which is pivoted at 8 and which has at its upper end a roller 9 engaging a cam 10 on a shaft 11. Arms 12 are pivotally connected at their lower ends to the rod 5, as shown at 13, being rigidly connected at their upper ends to rock shafts 14 extending transversely of the bottom of the furnace and each having rigid therewith a pair of laterally-spaced levers 15, the levers being located below the beams 3 and each having at its upper end a roller 16 adapted to engage the lower face of the beam thereabove. The opposite end of each lever 15 has pivoted thereto a rod 17 carrying a counterweight 18.

For the purpose of moving the walking beams 3 rearwardly, when elevated, and moving them forwardly to initial position, while lowered, I provide each beam with a depending leg 19, the legs being connected by a block 20. The shaft 11 is provided with a crank 21 having one end of a link 22 connected thereto, the link extending through the block 20 and being provided with block-engaging abutments 23, 24 on opposite sides of the block. Several abutments 24 may be employed, the same being removably mounted upon the rod 22, whereby the distance between the front abutment 22 and the particular operating rear abutment 24 may be varied, thereby to effect like variations in the extent of the lost-motion connection between the link and the block 20 with corresponding variations in the periods of rest between the reciprocations of the walking beams. E denotes a quenching tank at the rear of the furnace, there being a chute arranged to receive the articles as they are delivered from the rear end of the hearth by the walking beams. As will be seen in Fig. 2, the rear end of the hearth comprises a transversely extending block $1^a$ having slots $2^a$ for angular rear extensions $3^a$ of the walking beams. The rear end of the block $1^a$ is beveled downwardly and rearwardly, and from the bottom of such beveled portion extend the laterally-spaced chute members 25, the outer chute members being provided each with a side flange $25^a$, the flanges serving as side walls for the chute. Each chute member is provided with a transversely extending bottom flange $25^b$ the said flanges constituting a chute bottom adapted to receive an article delivered to the chute and to hold it in operative relation to the transversely-alined lifters $26^a$ mounted on cross bars $26^b$ extending between and carried by a pair of conveyor chains 26, the said chains being mounted on lower sprockets 27 carried by a transverse shaft 28. The mounting of the upper ends of the chains will be described hereinafter.

In connection with the mechanism for feeding the articles through the chamber A, I provide take-off mechanism for receiving the articles as they are delivered over the rear end $1^a$ of the hearth and for maintaining said articles transversely of the chute while lowering them to a position adjacent the lifters $26^a$ before releasing them. This delivers the articles upon the transversely-alined lifters as they pass upwardly through the slots $25^c$ between the chute sections 25, this delivering being effected without injury to the chains by severe impact thereagainst. In connection with this take-off mechanism, I employ mechanism for blocking or preventing premature delivery of articles to the chute. These mechanisms will now be described. 29 denotes a rock shaft mounted beneath and extending transversely of the furnace, the said shaft being provided with an arm 30 which is connected by a link 31 with a lever 32 which is pivoted at its lower end to a suitable support 33 and is connected intermediate of its ends by a link 34 with the rod 5 which raises and lowers the walking beams.

Figure 6:
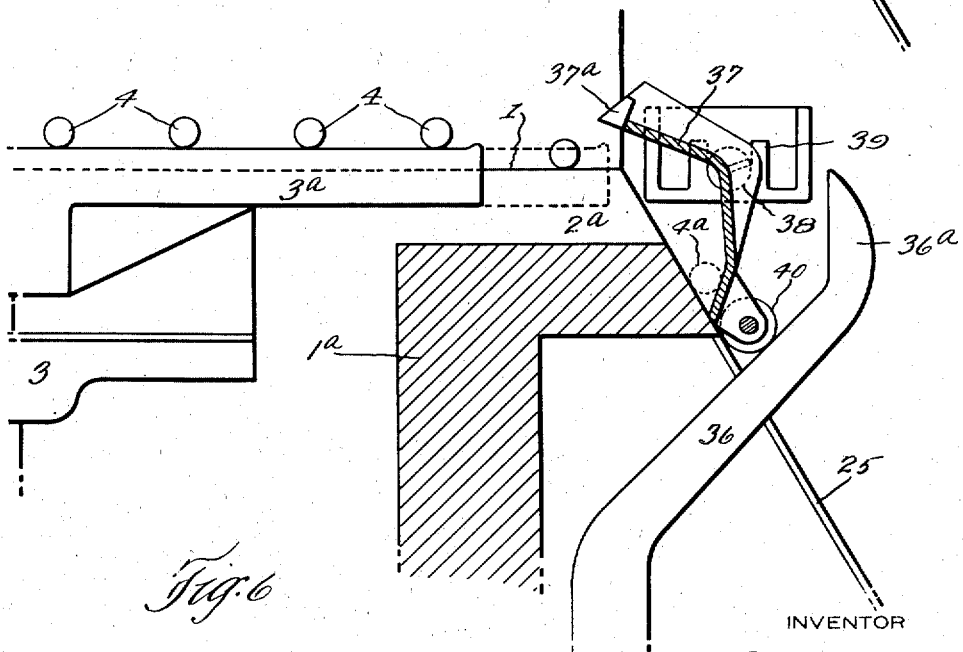

Rigid with the rock shaft 29 is a series of arms 36, three such arms being shown and the arms being adapted to work within the slots provided between the chute members 25. When the walking beams are in their lowered positions, the arms 36 will be thrown downwardly to the position shown in Fig. 1, with their ends $36^a$ below and in front of the chute. When the walking beams are in their elevated position, as shown in Fig. 2 the rod 5 will have operated the rock shaft 29 to project the ends $36^a$ of the arms through the slots $25^c$ and to move such ends to the upper ends of the slots, in position to receive the articles delivered from the hearth. The manner in which the work is so delivered will be apparent from Figs. 5 and 6. The former figure shows the articles 4 supported by the hearth sections 1, the rearmost article being adjacent to the rear end of the hearth and the walking beams being in their lowered and rearward position. In Fig. 6, the walking beam is shown in full lines in its elevated forward position, in which position it lifts all of the pieces of work or articles 4 except the rearmost article, which is supported upon the hearth sections 1. When the walking beams are moved rearwardly to the position shown in dotted lines, the rearmost piece of work is moved thereby beyond the rear edge of the hearth and drops down the chute, as shown in dotted lines at $4^a$, in position to be received by the arms 36 except for the action of the blocking mechanism which is employed to prevent a premature or accidental delivery of an article in the chute and into the quenching tank. This blocking mechanism comprises an L-shaped frame, indicated generally at 37 and having at its front end the obstructing flanges $37^a$, the front of the frame being adapted to rest upon the rear of the hearth section $1^a$ (see Fig. 5). This frame 37 is provided with trunnions 38 mounted in journals 39 in the sides of the furnace, being overweighted forwardly so that it tends to rest with its front edge upon the rear of the hearth. In the bottom of the frame 37 are mounted rollers 40, these rollers registering with the slots $25^c$ between the chute members 25. The parts are so arranged that, when the beams 3 are elevated, the motion of the rod 5 will rock the shaft 29 to throw the arms 36 upwardly, the upper ends 36ª of these arms, engaging the rollers 40, tilt the frame 37 to the position shown in Fig. 6, thereby providing a space below the front of said frame for the passage of a piece of work 4 over the rear end of the hearth. On the rearward movement of the walking beams, this piece of work is moved over the rear end of the hearth by the walking-beam extensions 3ª and drops down into the pocket formed between the bottom of the frame 37 and the beveled rear wall of the hearth. Through the lowering movement of the walking beams, the arms 36 are lowered, thereby disengaging the rollers 40, receiving the article 4ª and lowering the same nearly to the bottom of the chute, when the arms pass through the slots between the chute members and deliver the article upon the transversely-alined lifters 26ª.

The upper ends of the conveyor chains 26 pass around idle sprockets 41 so located as to cause the lifters 26ª to deliver the articles carried thereby upon the side chains 42 of a conveyor, the same traveling on tracks 43 within the chamber D. The chains 42 are supported at their rear ends on idle pinions 44 which may be conveniently mounted loosely upon the shaft 45 which carries the idle sprockets 41. The chains 26 pass over sprockets 46 mounted on a shaft 47 and thence around idle sprockets 48 and back to the sprockets 27. The lever 7 is loosely mounted on the shaft 8, which is the drive shaft for the conveyors. On one end of the shaft is a sprocket 49. A chain 50 passes around this sprocket and around a sprocket on the shaft 51, thereby driving said shaft and a sprocket 52 thereon. A chain 53 passing around the last mentioned sprocket drives a sprocket 54 at the rear of the furnace. On the shaft 55 of the last mentioned sprocket is a gear (not shown) which meshes with a gear (not shown) on the shaft 47, thereby to drive the said sprocket and the conveyor chains 26 in the appropriate direction. A sprocket (not shown) on the shaft 51 and a chain 56 extending around such sprocket and around a sprocket 57 drive a shaft 58. This shaft supports the front sprockets 59 about which the conveyor chains 42 extend.

In the furnace shown herein, the combustion chamber B will be provided with suitable burners (not shown), the arch B′ beneath the said chamber being provided with perforations B² which will permit access of heat and products of combustion to the chamber A. From the bottom of the chamber A a flue 60 delivers the products of combustion to the intermediate chamber C. This chamber is heated by the products of combustion as well as by the arch B² above the chamber B. The products of combustion in the chamber C heat the wall 61 between the chambers C and D, while the products from the chamber C are delivered into the chamber D through flues 62, whence they are discharged through flues 63. One of the burner inlets is indicated at 64.

With the parts constructed and arranged as described the operation will be briefly as follows:—The articles 4 are conducted through the chamber A, step by step, by the movements of the walking beams 3 described hereinbefore, these movements being effected by the cam 10, lever 7, rod 5, arms 12, arms 15, and by the crank 21, rod 22, and the abutments 22, 24, arms 19, and block 23. During each reciprocation of the rod 5, the arms 30 are moved upwardly to rock the frame 37 rearwardly thereby to receive the article delivered from the rear end of the hearth by the rearward movement of the elevated walking beams. The movement of the rod 5 in the reverse direction lowers the arms 36, carrying the article 4ª with them to near the bottom of the chute 25, where it is delivered to transversely-alined lifters 26ª on the conveyor chains 26 and delivered onto the conveyor chains 42 and conducted through the upper heat-treatment chamber.

Having thus described my invention, what I claim is:

1. The combination, with a first and second heat-treatment chamber, of means for conveying articles progressively through the first chamber, a quenching tank below the delivery end of the first chamber, a chute between said first chamber and said tank, a conveyor extending from said tank to the other chamber, the said conveyor having series of laterally spaced article-supporting members, and movable means coperating with the chute for receiving articles delivered successively thereto from the first chamber and for delivering them in proper operative relation to the said members.

2. In an apparatus of the character described, the combination of a first and a second heat-treatment chamber and means for heating the same, of a quenching tank interposed between said chambers and located below the first chamber, means for moving articles progressively through the first chamber and delivering the same to said tank, a conveyor in the second chamber, a conveyor having laterally spaced series of article-supporting members and arranged to deliver articles from said tank to the other conveyor, and movable means cooperating successively with the articles delivered from the first chamber for delivering them in proper relation to corresponding supporting members on the second conveyor.

3. In an apparatus of the character described, the combination of a lower and an upper heat-treatment chamber, a quenching tank below said chambers, a chute interposed between the delivery end of one of said chambers and the tank, means for feeding articles progressively through the last-mentioned chamber and for delivering them to the upper portion of said chute, a series of laterally spaced arms, means operative through the delivery of articles to the upper end of said chute for moving the said arms upwardly in the position to receive an article delivered to such portion of the chute and for moving the said arms downwardly to convey an article received thereby to the lower portion of said chute, and a conveyor arranged below said arms and having a series of laterally-spaced lifting members arranged to receive the articles conveyed by said arms, the said conveyor extending in operative relation to the other heat-treatment chamber.

4. In an apparatus of the character described, the combination of a lower and an upper heat-treatment chamber, a quenching tank below the said chambers, a chute interposed between the delivery end of one of said chambers and the tank, means for feeding articles progressively through the last-mentioned chamber and for delivering them to the upper portion of said chute, a series of laterally spaced arms arranged to operate in one or more vertically arranged slots in said chute thereby to receive articles delivered to the upper portion of said chute, and means operative by the article-feeding means for moving the said arms in position to receive the articles delivered to such portion of the chute and for moving the said arms downwardly in said slot or slots, and a conveyor arranged below said arms and having a series of laterally-spaced lifting members arranged to receive the articles from said arms, the said conveyor extending in operative relation to the other heat-treatment chamber.

5. An apparatus for the heat-treatment of articles comprising a lower heat-treatment chamber and an upper heat-treatment chamber and means for heating the same, means for conveying articles progressively through the first-mentioned chamber, a quenching tank below the delivery end of the first-mentioned chamber, a conveyor extending from said quenching tank to the upper chamber, the said conveyor having series of laterally spaced lifting members, a chute for receiving articles from the delivery end of the first mentioned chamber and delivering them into the said tank, in operative relation to said lifting members, article-receiving arms adapted to receive articles from the delivery end of the first-mentioned chamber and support and conduct them along said chute and deliver them to the appropriate lifting members, and means controlled by the feeding of the articles through the first mentioned chamber for operating the said arms.

6. An apparatus for the heat treatment of articles comprising a lower heat-treatment chamber and an upper heat-treatment chamber and means for heating the same, means for conveying articles progressively through the first-mentioned chamber, a quenching tank below the delivery end of the first mentioned chamber, a conveyor extending from said quenching tank to the upper chamber, the said conveyor having series of laterally spaced lifting members, a chute for receiving articles from the delivery end of the first mentioned chamber and delivering them into the said tank, in operative relation to said lifting members, article-receiving arms adapted to receive articles from the delivery end of the first-mentioned chamber and support and conduct them along said chute and deliver them to the appropriate lifting members, and means for operating the said arms.

7. In an apparatus of the character described, the combination of a lower heat-treatment chamber, an upper heat-treatment chamber, a quenching tank below the lower chamber, a hearth in the lower chamber, one or more beams each operable through a slot in said hearth, means for raising and lowering and reciprocating the said beam or beams whereby articles to be heated in the first chamber may be conducted step by step through the said chamber to the delivery end thereof, a vertically-slotted chute at the delivery end of the hearth and leading to said tank, a conveyor extending from said tank in operative relation to the upper chamber, the said conveyor having laterally spaced series of lifting members arranged to pass through the slots in the said chute, arms pivotally supported adjacent the rear of the said furnace and arranged to be moved upwardly and downwardly in the slots of the chute thereby to receive the articles as they are delivered successively from the said hearth and to support them in proper position for delivery to the lifting member, and means connected with the beam-operating means for operating the said arms.

8. In an apparatus of the character described, the combination of a lower heat-treatment chamber, an upper heat-treatment chamber, a quenching tank below the lower chamber, a hearth in the lower chamber, one or more beams each operable through a slot in said hearth, means for raising and lowering and reciprocating the said beam or beams whereby articles to be heated in the first chamber may be conducted step-by-step through the said chamber to the delivery end thereof, a chute at the delivery end of the hearth and leading to said tank, a conveyor extending from said tank in operative relation to the upper chamber, the said conveyor having laterally-spaced series of lifting members, arms pivotally supported adjacent the rear of the said furnace and arranged to be moved upwardly and downwardly thereby to receive the articles as they are delivered successively from the said hearth and to support them in proper position for delivery to the lifting members and means for operating the said arms.

9. In a furnace having a heat-treatment chamber and means for feeding articles successively through said chamber to the delivery end thereof, a quenching tank, a vertically slotted chute extending from the delivery end of said chamber to said tank, arms pivoted so that their ends may be moved through the said slots and upwardly into article-receiving position and downwardly into delivering position adjacent the lower end of said chute, a conveyor, having laterally-spaced series of lifting members operable through said slots and adapted to receive articles dropped from the ends of said arms, and means controlled by the feed of the articles through the said chamber for operating the said arms.

10. In a furnace having a heat-treatment chamber with a hearth and means for moving articles to be heat-treated progressively through said chamber, a transversely arranged series of arms adapted to receive articles delivered by said moving means from the rear end of said hearth and to deliver the same to a conveyor, means operated by such article-moving means for moving the arms into receiving position when the beams are moved rearwardly and for lowering the said arms into delivery position when the beams are moved forwardly, and means normally blocking the delivery of articles from said hearth, the last mentioned means being adapted to be moved out of blocking relation to said hearth when the arms are in article receiving position.

11. In a furnace having a heat treatment chamber with a hearth and one or more beams for moving articles to be heat treated successively through said chamber, movable means adapted to receive articles delivered by said beams from the rear end of said hearth and to deliver the same to a conveyor, means for moving the last-mentioned means into receiving position when the beams are moved rearwardly and for lowering the same into delivery position when the beams are moved forwardly, and means normally blocking the delivery of articles from said hearth, the last-mentioned means being adapted to be moved out of blocking relation to said hearth when the receiving and delivering means are in article-receiving position.

12. In a furnace for the heat-treatment of articles, the combination of a chamber having a hearth, one or more beams for feeding articles progressively through said chamber, the said beams being movable to positions above and below said hearth, with means for moving the beams rearwardly when in elevated position and forwardly when in depressed position, there being a delivery chute at the rear end of said hearth and the said beams being arranged, when in their upper and rearward position, to deliver the rearmost articles to said chute, an L-shaped member pivoted adjacent the rear end of said hearth with its upper end normally blocking the delivery of an article therefrom to said chute, and laterally spaced arms movable into article-receiving and article-delivering position, one of said arms being arranged to engage the said blocking member as said arms are moved into receiving position, thereby to operate the blocking member and to permit the articles to be delivered from the hearth to the said arms.

13. In a furnace for the heat-treatment of articles the combination of a chamber, means for feeding articles progressively through said chamber, an L-shaped member pivoted adjacent the rear end of said hearth with its upper end normally blocking the delivery of an article therefrom, means movable into article-receiving and article-delivering position, the said means being arranged to engage the said blocking member when moved into receiving position, thereby to operate the blocking member and to permit the articles to be delivered from the hearth to the said receiving and delivering means.

14. In an apparatus of the character described, the combination, with a first and a second heat-treatment chamber and means for heating the same, of a quenching tank interposed between said chambers and located below the first mentioned chamber, a hearth in the first mentioned chamber, a chute interposed between the rear end of said hearth and the said tank, means for feeding articles to be heated progressively through the first of said chambers and for delivering the same to said chute, a conveyor extending from the quenching tank in operative relation to the second chamber, the said conveyor having series of laterally spaced lifting members, and receiving means, operable by the movement of the said feeding means, for receiving the articles successively as they are delivered from the hearth and delivering them to the lower portion of the chute and in proper operative relation to the lifting members on the said conveyor.

15. A furnace comprising a heat-treatment chamber having a slotted hearth, one or more beams each operable in a slot of the hearth, means for moving the said beam or beams vertically and longitudinally relative to said hearth whereby the said beam or beams are projected above the hearth to lift the articles thereupon, are moved rearwardly, are lowered to deposit the articles in advanced position upon the hearth, and are moved rearwardly to initial position, the rear ends of the beams being so located as to dislodge from the delivery end of the hearth the rearmost article thereon by the movement of the said beams rearwardly, an L-shaped member pivotally supported at the rear of the delivery end of the hearth with its front portion adapted to block the delivery of the rearmost article from said hearth, and a work-receiving arm movable toward and from the delivery end of the hearth and adapted to engage the said member when moved to work-receiving position thereby to rock the member away from its work obstructing position and permit the article to be delivered from the hearth by the movement of said beam or beams.

16. A furnace comprising a heat-treatment chamber, means for feeding articles progressively through said chamber, an L-shaped member pivotally supported at the rear of the delivery end of the chamber with its front portion adapted to block the delivery of the rearmost article therefrom, and a work-receiving member movable toward and from the delivery end of the hearth and adapted to engage the said blocking member when moved to work-receiving position, thereby to rock the latter member away from its work-obstructing position and permit the article to be delivered from said chamber.

17. A furnace comprising a heat-treatment chamber having a slotted hearth, one or more beams each operable in a slot of the hearth, means for moving the said beam or beams vertically and longitudinally relative to said hearth whereby the said beam or beams are projected above the hearth to lift the articles thereupon, are moved rearwardly, are lowered to deposit the articles in advanced position upon the hearth, and are moved rearwardly to initial position, the rear ends of the beams being so located as to dislodge from the delivery end of the hearth the rearmost article thereon by the movement of the said beams rearwardly, an L-shaped member pivoted adjacent to the rear of the hearth and adapted to swing by gravity about its pivotal support thereby to block with its front end the delivery of an article from the rear end of said hearth, rollers on the lower end of said member, receiving arms movable toward and from the delivery end of the hearth and each arranged, when moved to receiving position, to engage a roller on said member thereby to rock the member to move its front portion out of work-obstructing position, and connections between the said arms and the said beams for raising the same to work-receiving position in time to receive the article dislodged by the rearward movement of the beam or beams and to lower the arms to delivering position before the next rearward movement of the beam or beams.

18. A furnace comprising a heat-treatment chamber, means for feeding articles progressively through said chamber, an L-shaped member pivoted adjacent to the rear of the chamber and adapted to swing by gravity about its pivotal support thereby to block with its front end the delivery of an article from the rear end of said chamber, receiving means movable toward and from the delivery end of the chamber and arranged when moved to receiving position, to engage the said member thereby to rock the same and move its front portion out of work-obstructing position, and connections between the said receiving means and the feeding means for moving the former means to work-receiving position in time to receive an article delivered by the feeding means from the chamber.

19. A heat-treatment furnace comprising an intermediate combustion chamber, a heat-treatment chamber below said combustion chamber and a heat-treatment chamber above said combustion chamber, a conveyor in the upper chamber, means for feeding articles successively through the first-mentioned chamber, a quenching tank beneath the first-mentioned chamber, a conveyor for conducting articles from said tank to the first mentioned conveyor, and means for delivering articles from the first mentioned chamber to the tank and to the second conveyor.

20. In a furnace having a chamber for the heat treatment of articles and a quenching tank below the delivery end of said chamber, means for feeding the articles to be treated progressively through said chamber, movable means adapted to receive the articles delivered from said chamber and to lower the same into said tank, and means controlled by the article-feeding means for operating said means.

21. In a furnace having a chamber for the heat treatment of articles and a quenching tank below the delivery end of said chamber, means for feeding the articles to be treated progressively through said chamber, arms adapted to receive the articles delivered from said chamber and to lower the same into said tank, and means controlled by the article-feeding means for operating said arms.

22. In an apparatus of the character described, the combination, with a lower heat-treatment chamber, an upper heat-treatment chamber, and a combustion chamber between the said heat-treatment chambers, of means for feeding articles progressively through the first heat-treatment chamber, a quenching tank below the delivery end of the first heat-treatment chamber, a conveyor having its lower end in said tank and its upper end arranged in operative relation to the upper heat-treatment chamber, and means for delivering articles successively from the first heat-treatment chamber into the quenching tank and on the portion of the conveyor therein.

23. In an apparatus of the character described, the combination, with a lower heat-treatment chamber, an upper heat-treatment chamber, and a combustion chamber between the said heat-treatment chambers, of means for feeding articles progressively through the first heat-treatment chamber, a quenching tank below the delivery end of the first heat-treatment chamber, a conveyor having its lower end in said tank and its upper end arranged in operative relation to the upper heat-treatment chamber, the said conveyor being provided with article-supporting members, and means for delivering to the quenching tank and to the members on said conveyor articles discharged from the first heat-treatment chamber.

24. In an apparatus of the character described, the combination of a heat-treatment chamber, means for feeding articles progressively through the said chamber, a quenching tank arranged to receive the articles delivered from said chamber, a second heat-treatment chamber vertically spaced from the first heat-treatment chamber, a conveyor for conducting to the second chamber articles delivered to said tank from the first chamber, means for feeding the articles so delivered progressively through the second chamber, and means for heating both of said chambers.

25. In an apparatus of the character described, the combination of a furnace having therein vertically spaced heat-treatment chambers and means for heating said chambers, means for feeding articles progressively through one of said chambers and a quenching tank arranged to receive the articles delivered from such chamber, a conveyor for conducting articles from the tank to the other of said chambers and means for feeding progressively through the second chamber the articles delivered thereto by the conveyor.

In testimony whereof, I hereunto affix my signature.

HARRY P. McCANN.